United States Patent
Edson

(10) Patent No.: US 7,400,997 B2
(45) Date of Patent: Jul. 15, 2008

(54) INTEGRATED INSTRUMENT DRIVER NETWORK

(75) Inventor: Patrick L. Edson, Newton, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 11/140,137

(22) Filed: May 26, 2005

(65) Prior Publication Data

US 2006/0271329 A1    Nov. 30, 2006

(51) Int. Cl.
G06F 19/00    (2006.01)

(52) U.S. Cl. ....................................................... 702/122

(58) Field of Classification Search ................. 702/122, 702/62, 188; 340/1
See application file for complete search history.

(56) References Cited

U.S. PATENT DOCUMENTS

| | | | |
|---|---|---|---|
| 5,870,610 A * | 2/1999 | Beyda | ........................ 717/173 |
| 6,269,481 B1 | 7/2001 | Perlman et al. | |
| 2002/0174264 A1 | 11/2002 | Fuller et al. | |
| 2003/0018805 A1 * | 1/2003 | Meyerson | .................... 709/237 |
| 2003/0056018 A1 | 3/2003 | Pike et al. | |

OTHER PUBLICATIONS http://www.m-w.com/dictionary/metadata, p. 1.*

* cited by examiner

Primary Examiner—Tung S Lau
(74) Attorney, Agent, or Firm—Lahive & Cockfield, LLP; Kevin J. Canning

(57) ABSTRACT

A mechanism for transparently identifying and retrieving an instrument driver to an application development environment tat is associated with a user-selected instrument is disclosed. Following a user selection of an instrument through a user interface generated by the application development environment, an instrument driver associated with the selected instrument is programmatically identified. If the required instrument driver for the selected instrument is missing from the application development environment, an embodiment of the present invention retrieves the instrument driver from a remote location and installs the instrument driver in the application development environment without the involvement of the user. The present invention also generates a user interface from the application development environment which enables a user to see currently installed instrument drivers as well as available instrument drivers that are located both locally and remotely.

42 Claims, 5 Drawing Sheets

INTEGRATED INSTRUMENT DRIVER NETWORK

FIELD OF THE INVENTION

The illustrative embodiment of the present invention relates generally to the use of instrument drivers and more particularly to the transparent installation and use and sharing of instrument drivers from within an application development environment.

BACKGROUND

Instrument control applications require instrument drivers so that they may be easily utilized by end users. An instrument driver differs from a regular OS driver in that an instrument driver does not extend the capabilities of an application development environment (ADE) in the way OS drivers typically extend an operating system's ability to communicate with new devices. Instrument drivers generally provide a layer of convenience functions that simplify communication with a specific instrument model using an existing communication and hardware interface layer that is already supported by operating system drivers. Current application development environments, such as MATLAB, SIMULINK (both from The MathWorks, Inc. of Natick, Mass.), test and measurement and other ADEs, ship instrument drivers on a CD with the ADE. Alternatively, the instrument drivers may be made available to the end user for download via a website.

Unfortunately, both the technique of pre-shipping the instrument driver on CD with the ADE and the technique of providing the instrument drivers via a web site, fail to leverage the benefits of integrated instrument driver access from within the application development environment. Current techniques of retrieving remotely located instrument drivers require a web interface to browse and download drivers. Additionally, current techniques do not allow the user to verify current instrument drivers in the ADE while determining what other instrument drivers are available. The instrument drivers cannot be used directly from the web interface but rather must be downloaded and installed before use in the application development environment.

Another problem with current techniques of using instrument drivers in an application development environment is that while the user may be notified of instrument driver changes in an instrument driver repository by email or similar manner, conventional methods do not inform the user that an instrument driver in the ADE is out of date. Further, the conventional methods of updating an instrument driver do not allow a user to submit updated drivers from the ADE to a centralized repository. Rather, the user is forced to utilize a web interface and add a lot of information manually that may already be present in the driver. Further, while companies provide web interfaces for their own repositories of instrument drivers, the companies do not provide a mechanism for a customer working with their own repository of drivers that they want to make available internally.

BRIEF SUMMARY

The illustrative embodiment of the present invention provides a mechanism for transparently identifying and retrieving an instrument driver to an application development environment that is associated with a user-selected instrument. The instrument driver is software providing an API (Application Programming Interface) appropriate for the hardware interface of the selected instrument. The instrument driver includes a library of executable functions that programs or models in the application development environment may call to establish and control communication with the selected instrument. Following a user selection of an instrument through a user interface generated by the application development environment, an instrument driver associated with the selected instrument is programmatically identified. The application development environment is checked to see if the required instrument driver is missing. If the required instrument driver for the selected instrument is missing from the application development environment, the present invention retrieves the instrument driver from a remote location and installs the instrument driver in the application development environment without the involvement of the user.

In one aspect of the illustrative embodiment of the present invention, metadata associated with the instrument driver is examined before any installation of the instrument driver takes place. The present invention also generates a user interface from the application development environment which enables a user to see currently installed instrument drivers as well as available instrument drivers that are located both locally and remotely. Additionally, the present invention provides the ability for a user to contribute an instrument driver from an application development environment to a repository or multiple repositories.

In one embodiment in an application development environment, a method of selecting instrument drivers includes the step of selecting an instrument through the application development environment. The method further includes the step of determining without user involvement that an instrument driver associated with the selected instrument is missing from the application development environment. The method additionally includes the step of retrieving the missing instrument driver to the application development environment from a remote location without involvement of a user.

In another embodiment in an application development environment, a method of selecting instrument drivers includes the step of providing a user interface within the application development environment that identifies at least one currently installed instrument driver and enables the selection of an instrument driver from a group of instrument drivers located locally and remotely. The method further includes the step of selecting one of the multiple instrument drivers through the user interface. Additionally, the method includes the step of examining a collection of metadata associated with the selected instrument driver prior to an installation of the selected instrument driver.

In an embodiment in an application development environment a method of selecting instrument drivers includes the step of selecting an instrument in a block diagram model displayed by the application development environment. The method programmatically queries without user involvement the selected instrument to obtain information about an associated instrument driver needed to communicate with the selected instrument. The method further determines without user involvement that the instrument driver associated with the selected instrument is missing from the application development environment. Additionally, the method retrieves the missing instrument driver to the application development environment without involvement of the user.

In one embodiment in an application development environment, a system for selecting instrument drivers includes a user interface generated from the application development environment that enables the selection of an instrument. The system further includes at least one storage location holding an instrument driver associated with the selected instrument. The system further includes means for programmatically determining without user involvement that an instrument driver associated with the selected instrument is missing from the application development environment. The system additionally includes means for retrieving the missing instrument driver to the application development environment from a remote location without involvement of a user.

In an embodiment in an application development environment, a method of uploading instrument drivers includes the step of selecting an instrument through a user interface in the application development environment. The method further includes the step of querying programmatically without user involvement the selected instrument to obtain instrument driver information for the instrument. The method uses the instrument driver information to automatically determine whether the instrument driver associated with the selected instrument is missing from a repository of instrument drivers. Missing instrument drivers are uploaded to the repository of instrument drivers from the application development environment.

DETAILED DESCRIPTION

Figure 1:
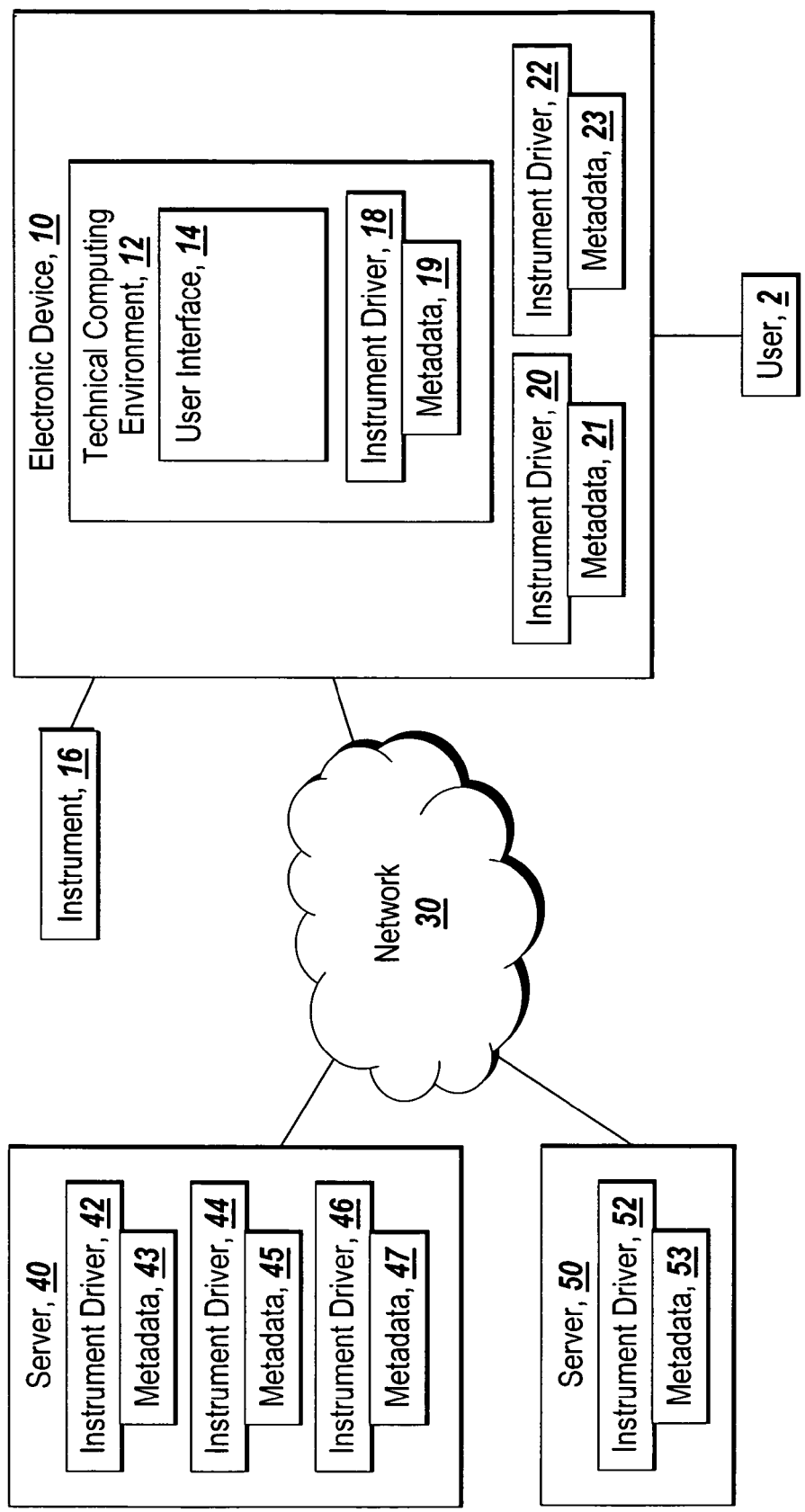
FIG. 1 depicts an environment suitable for practicing the illustrative embodiment of the present invention.

The illustrative embodiment of the present invention provides the ability for a user to transparently use a remotely located instrument driver as instrument drivers associated with selected instruments are automatically downloaded and made available without the user's knowledge. The result of the automatic acquisition of the instrument driver is a seamless experience for a user within the application development environment (ADE) which allows the user to concentrate on application development rather than retrieval of the instrument driver. Users may be automatically notified of an updated instrument driver in a centralized repository when attempting to use an out of date instrument driver in the ADE. Once notified, the illustrative embodiment addresses the need for a unified interface in an ADE which shows both currently installed instrument drivers and instrument drivers that are available for downloading at both local and one or more remote locations. The illustrative embodiment also enables a user to contribute an instrument driver from the ADE to a centralized repository and have metadata associated with the instrument driver handled automatically by the repository.

In conventional instrumentation systems, a computer or other electronic device equipped with a processor communicates with control instruments such as oscilloscopes and function generators that can obtain data about dynamic real world systems under test. Users can model, simulate, or analyze data in the application development environment by establishing communication with the control instruments. Similarly, data acquisition devices such as multi-function input/output boards, dedicated digital I/O boards, sound cards and devices collecting data from network data sources and image acquisition devices such as an image capture boards, scanners and cameras collect data which may be utilized by electronic devices supporting application development environments. The application development environment may be a block diagram environment such as SIMULINK or a command-line environment like MATLAB.

Users connect the computer or electronic device to the control instruments, data acquisition device or image acquisition device through various interface options depending upon the hardware interface implemented by the particular control instrument or acquisition device. Interface options include, but are not limited to, serial, general purpose interface bus (GPIB), virtual machine environment extended for instrumentation (VXI), VXI-GPIB, IEEE 1394, PCI, ISA and USB (Universal Serial Bus). The electronic device or computer system usually executes a software instrument driver having a distinct API (Application Program Interface) appropriate for the hardware interface of the particular control instrument or acquisition device (the term "acquisition device" as used herein encompasses both image acquisition devices and data acquisition devices). The instrument driver includes a library of executable functions that a computer program may call to establish communication with the control instrument or acquisition device and control the parameters of communication. In one implementation, the instrument driver is used to create a device object that is used to communicate with an instrument using properties and functions defined in the instrument driver for a specific instrument model. The device object and an interface object may be used together to create an instrument object representing the instrument in the application development environment.

As noted above, block diagrams environments are one type of application development environment that may also be used to communicate with an instrument. During system modeling and simulation in the block diagram environment, it is frequently necessary to send simulation data from a block diagram being executed in the block diagram environment to a control instrument or acquisition device. Similarly, it is also frequently necessary to receive data from the control instrument monitoring an external system or acquisition device for use in a simulation being run in a block diagram environment. In order to interact with a control instrument or acquisition device, a proper instrument driver must be utilized by the computer system or electronic device for communication.

FIG. 1 depicts an environment suitable for practicing the illustrative embodiment of the present invention. An electronic device 10 hosts an application development environment 12. The electronic device 10 may be a workstation, desktop PC, a server, mainframe, laptop, PDA, or other electronic device equipped with a processor and capable of supporting the application development environment 12. The application development environment 12 may be an environment such as MATLAB, SIMULINK, (both from The MATHWORKS, Inc.) or some other type of application development environment. The application development environment 12 generates a user interface 14 which enables the selection of the instrument 16. Although the instrument 16 is depicted as being external to the electronic device 10, it should be noted that the instrument may also be part of the electronic device but located outside the application development environment 12. The user interface may be a command line interface, a graphical interface, a hybrid of the two types of interfaces or some other type of interface able to accept a user selection of an instrument. It will be appreciated by those skilled in the art that although the user interface 14 has been depicted as being displayed within the electronic device 10 for ease of illustration, in many implementations the user interface will be displayed to a user 2 on a separate display device in communication with the electronic device.

The application development environment also may include an instrument driver 18 that has been previously installed. The instrument driver 18 enables communication to occur between the application development environment 12 and the instrument 16. The instrument driver 18 may have associated metadata 19. The metadata 19 includes additional information about the parameters of the instrument driver 18. The electronic device 10 may also include an instrument driver 20 with associated metadata 21 and instrument driver 22 with associated metadata 23 that are present on the electronic device but have not been installed within the application development environment 12. It should be noted that for the purposes of the discussion contained herein that any instrument driver that is located outside of the application development environment is considered a remotely located instrument driver regardless of whether it is located on the same electronic device as the application development environment. Thus, instrument drivers 20 and 30 would be considered remotely located from application development environment 12 even though they are located on the same electronic device.

The electronic device 10 communicates over a network 30 with a server 40 and 50. The server 40 may include a plurality of instrument drivers 42, 44, and 46 and their respective associated metadata 43, 45, and 47. Similarly, server 50 may include instrument driver 52 with associated metadata 53. The network 30 may be a local area network (LAN), a wide area network (WAN), an internet, intranet, the Internet, a wireless network, or some other type of network over which the electronic device 10 may communicate with the servers 40 and 50. Those skilled in the art will realize that alternate implementations in which the instrument drivers 42, 44, 46 and 52 are located on other storage locations accessible over the network 30 are also possible without departing from the scope of the present invention.

Figure 2:
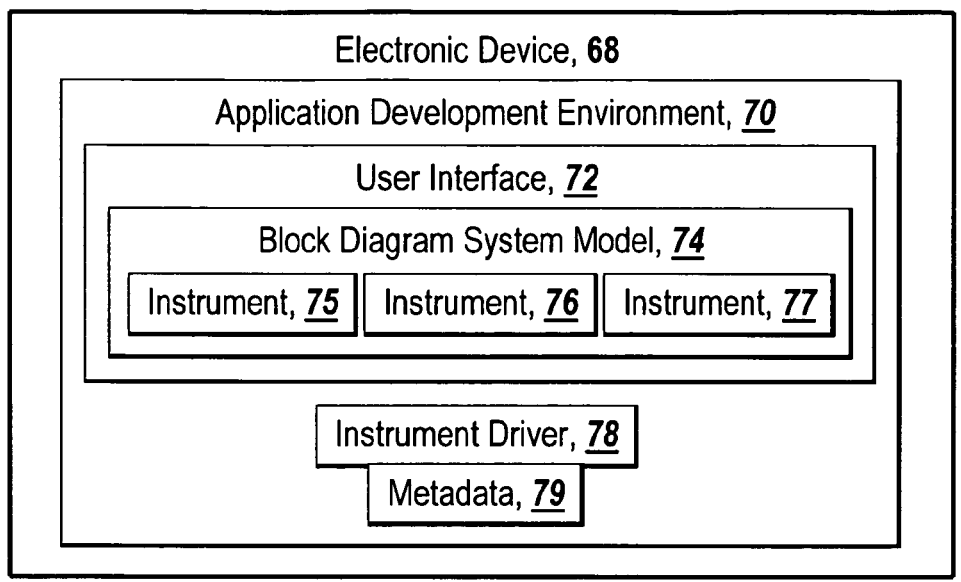
FIG. 2 depicts an alternate embodiment of the present invention wherein an instrument is selected from a displayed block diagram system model.

As noted above, the application development environment may be a block diagram environment in which a user is attempting to establish communication between a block diagram model and an instrument the user is selecting. FIG. 2 depicts a block diagram of an application development environment 70 used in an alternate embodiment of the present invention. The application development environment 70 generates a user interface 72 which displays a block diagram system model 74. Included within the block diagram system model 74 are multiple components including instruments 75, 76, and 77. Those skilled in the art will recognize that although for clarity of depiction the user interface 72 is depicted as being generated on the electronic device 68 that is hosting the application development environment 70, the user interface may be located on a display device separate from the electronic device hosting the application development environment. The application development environment 70 also includes an instrument driver 78 and metadata associated with the instrument driver 79 that has been installed in the application development environment. The instrument driver 78 enables the system model to communicate with the selected instrument represented by the block diagram system model instrument component 75, 76, or 77.

Figure 3:
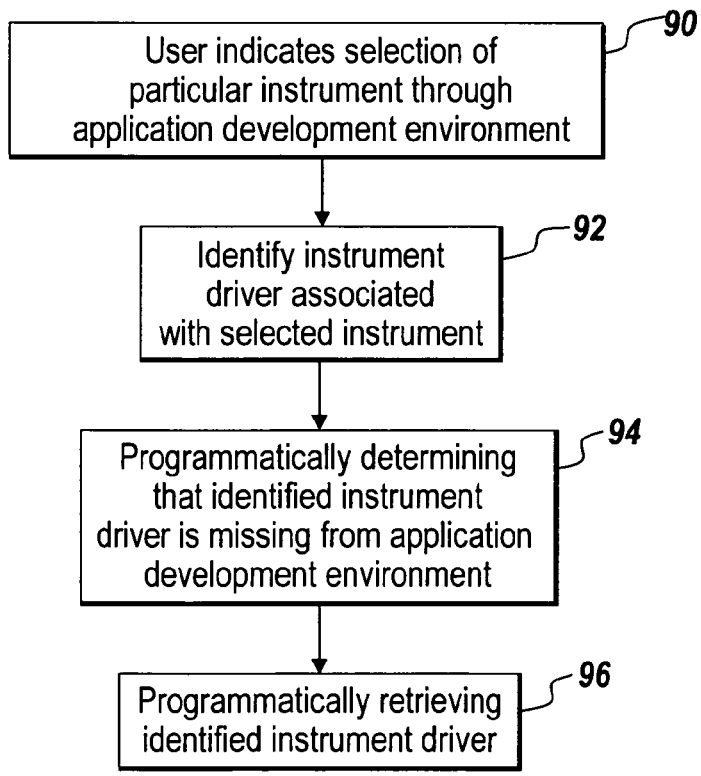
FIG. 3 is a flow chart of the sequence of steps followed by the illustrative embodiment of the present invention to retrieve an instrument driver without user involvement.

The present invention provides a mechanism that relieves a user from having to depart an application development environment in order to update or acquire an instrument driver. FIG. 3 depicts the sequence of steps followed by the illustrative embodiment of the present invention to programmatically retrieve an instrument driver necessary to communicate with a selected instrument from within an application development environment. The sequence of steps may begin when the user indicates the selection of a particular instrument through the application development environment (step 90). The instrument driver associated with the selected instrument is then programmatically identified without user involvement (step 92). This may be performed by querying the selected instrument, such as by automatically sending a command to the instrument asking the instrument to identify itself. The instrument responds with identifying information including the name of an instrument driver needed to communicate with the instrument. The application development environment is then programmatically checked to determine whether or not the identified instrument driver is installed in the application development environment (step 94). If it is determined that the required instrument driver for the selected instrument is not present, or needs updating in the application development environment, the illustrative embodiment of the present invention programmatically retrieves the instrument driver from a storage location and installs the instrument driver in the application development environment (step 96). The retrieval and installation happens without the participation of the user. In some implementations, the user may be automatically notified of the occurrence of the retrieval and installation. The notification may be made via a pop-up window within the application development environment or other similar mechanism, or through a non-immediate notification such as updating a list to which the user has access.

The instrument drivers may be associated with metadata. The metadata includes information about the instrument driver such as version information. In some implementations of the present invention, this information may be programmatically or manually examined prior to installation of the retrieved driver in the application development environment. The information in the metadata may be programmatically compared to a predetermined value so as to verify the correct driver is being retrieved. Alternatively, the user may be presented with the information.

Figure 4:
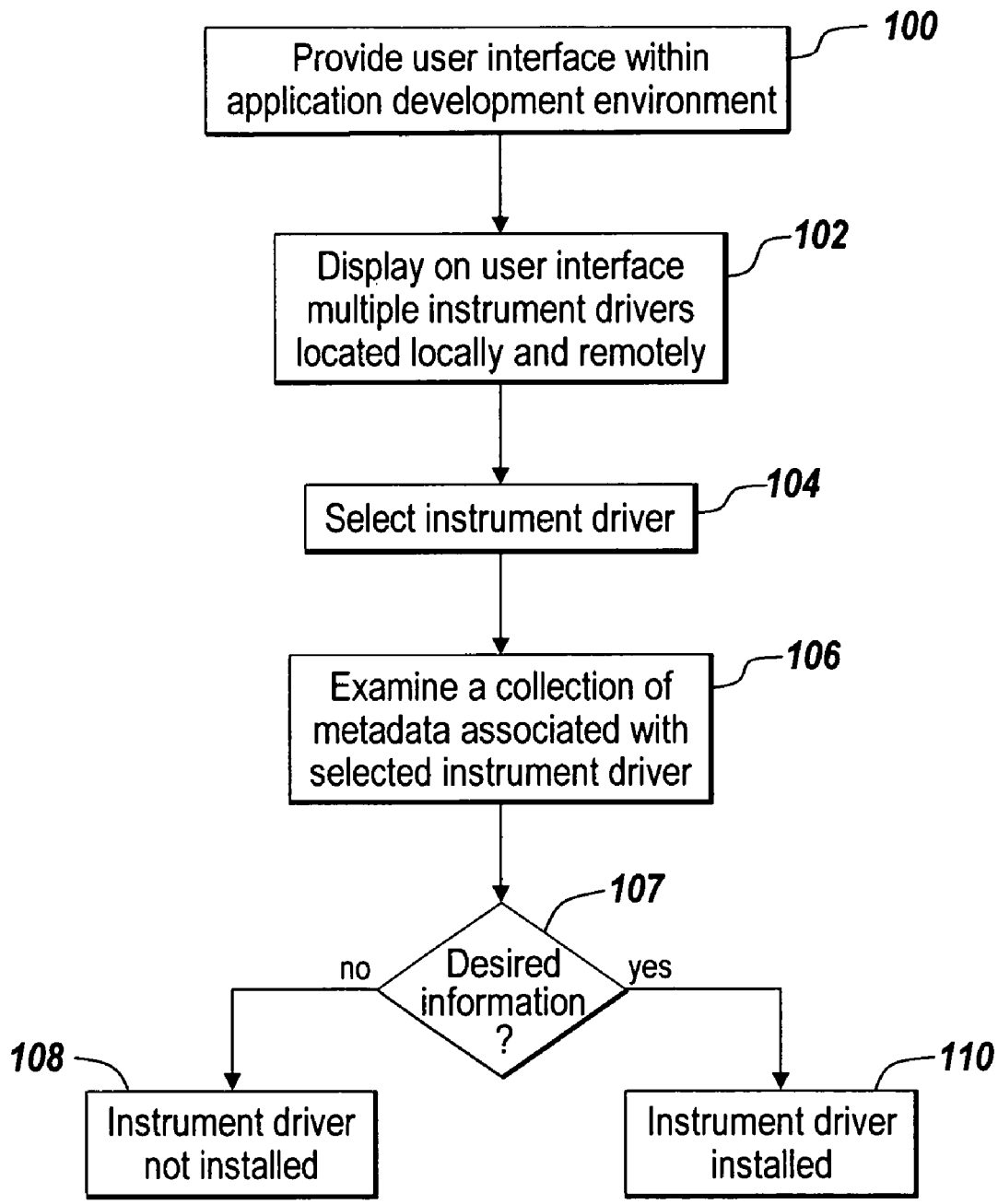
FIG. 4 is a flow chart of the sequence of steps followed by the illustrative embodiment of the present invention to examine metadata associated with an instrument driver prior to installation of the instrument driver.

FIG. 4 depicts the sequence of steps followed by the present invention to utilize the metadata as part of a retrieval sequence for an instrument driver that involves the user examining the metadata. The sequence begins with the provision of a user interface within the application development environment (step 100). The user interface may be a command line interface, a graphical interface, or a combination of the two. The lists of drivers presently installed in the application development environment as well as the available instrument drivers present in remote location are then displayed to the user (step 102) who then selects a desired instrument driver (step 104). As noted previously, the term "remote location" may be used to refer to a location that is separate from the electronic device hosting the application development environment and also a location on the electronic device hosting the application development environment but outside the actual application development environment. In an alternate implementation, the user interface is presented to the user following the user selecting an instrument with the driver being programmatically suggested by the application development environment. In another implementation, the user is informed that an instrument driver that is newer than the instrument driver selected by the user is available at a specified location.

The metadata associated with the selected instrument driver is then examined by the user (step 106) to determine whether the instrument driver is acceptable (step 107). In the event the information is not acceptable, the instrument driver is not retrieved or installed in the application development environment (step 108). Alternatively, if the metadata associated with the instrument driver is acceptable, the instrument driver is retrieved and installed in the application development environment without user assistance (step 110).

Figure 5:
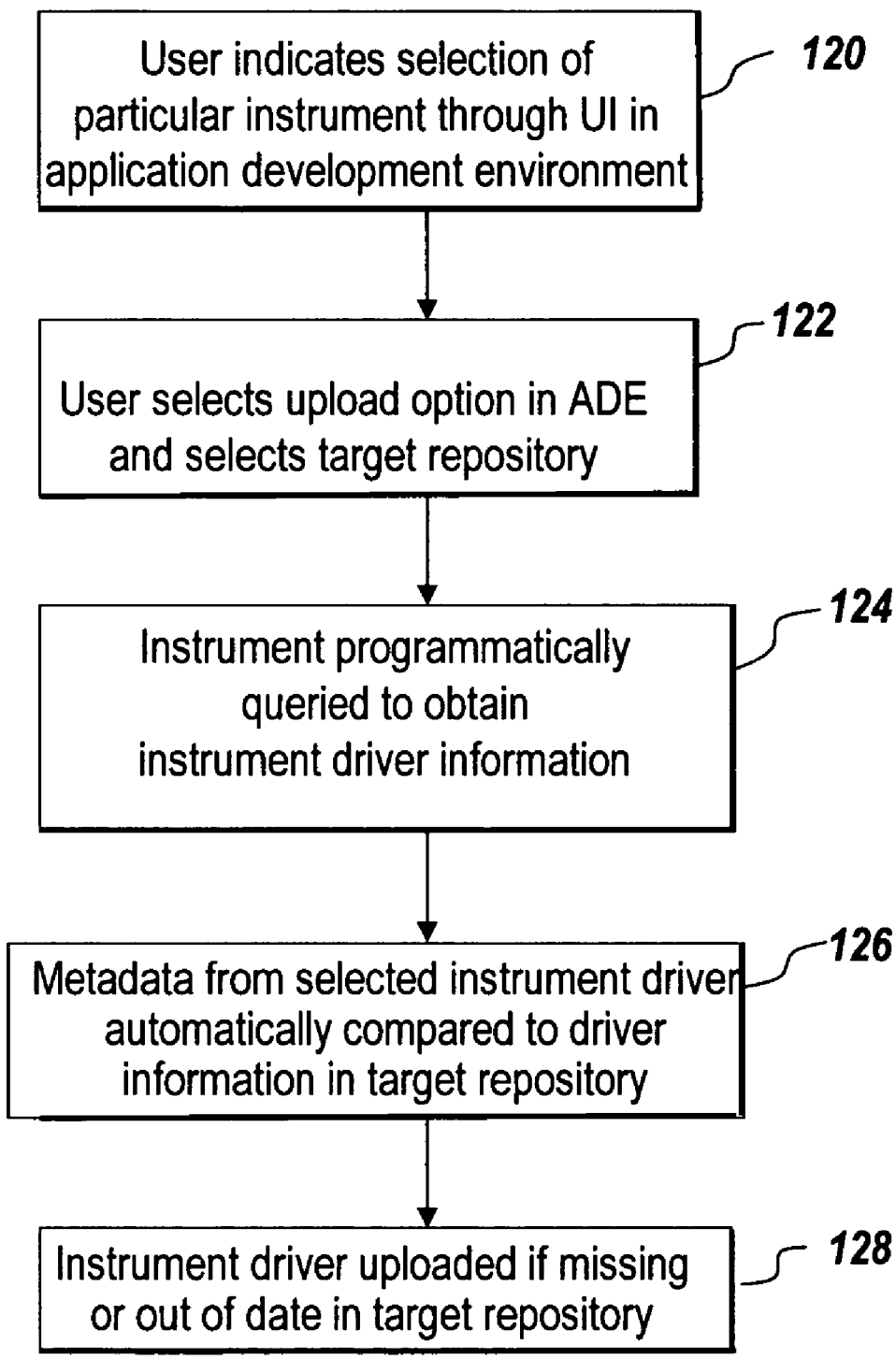
FIG. 5 is a flow chart of the sequence of steps followed by the illustrative embodiment of the present invention to upload an instrument driver from within an application development environment.

In another implementation, the present invention enables a user to select an installed instrument driver in the ADE to be added to an instrument driver repository. The sequence of steps followed by the present invention to upload an instrument driver directly from an ADE to a central repository of instrument drivers is depicted in FIG. 5. The sequence begins when the user indicates a selection of a particular instrument through the user interface in the ADE (step 120). After the user selects an upload option in the ADE and selects a target repository (step 122), the selected instrument is programmatically queried to obtain instrument driver information (step 124). The metadata from the selected instrument driver is then automatically compared to the instrument driver information in the target repository (step 126). The instrument driver is then uploaded without further user intervention if the instrument driver is missing or out of date in the target repository (step 128). It will be appreciated that the target repository may be a default option rather than being manually selected by the user. It will be further appreciated by those skilled in the art, that the present invention may be configured so that the instrument driver of any instrument selected through the UI in the ADE is automatically processed for possible uploading without the user affirmatively selecting an upload option or entering an upload command. Thus, in contrast to conventional techniques, the illustrative embodiment of the present invention enables the instrument drivers to be submitted directly from the ADE without using a web interface or manually adding instrument driver information which is duplicative of information already contained in the driver.

Figure 6:
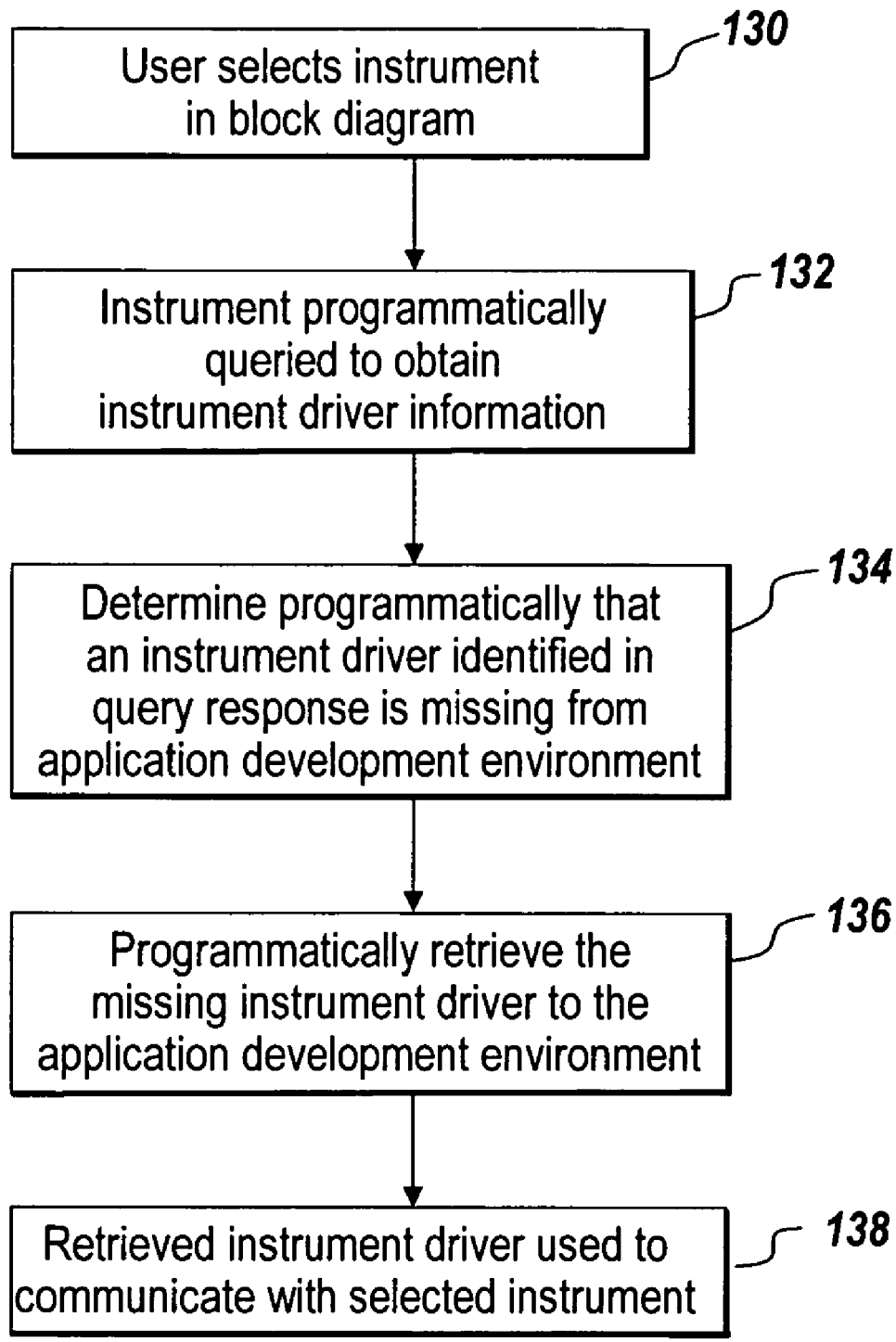
FIG. 6 is a flow chart of the sequence of steps followed by the illustrative embodiment of the present invention to programmatically retrieve an instrument driver transparently in response to the user selecting an instrument in a block diagram model.

The process by which an instrument driver is automatically retrieved to a block diagram environment is depicted in FIG. 6. The sequence begins with the selection by the user of an instrument displayed in a block diagram (step 130). The instrument is programmatically queried to obtain instrument driver information (step 132). The response to the query to the instrument indicates the particular instrument driver that should be used to communicate with the instrument. The block diagram environment is then examined to determine the presence or absence of the desired instrument driver (step 134). In the event the required/desired instrument driver is absent from the block diagram environment or needs updating, it is programmatically retrieved to the block diagram environment without the assistance of the user (step 136). The retrieved instrument driver is then used for communication with the selected instrument from the block diagram environment (step 138).

The present invention may be provided as one or more computer-readable programs embodied on or in one or more mediums. The mediums may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include C, C++, C#, or JAVA. The software programs may be stored on or in one or more mediums as object code.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

I claim:

1. A computer-implemented method of selecting instrument drivers for an application development environment, the method comprising:

providing an application development environment in a computing device, the computing device interfaced with at least one instrument that acquires data from a real world system under test, the application development environment performing at least one of modeling, simulating or analyzing of the data;

receiving a selection of the at least one instrument through a user interface operating in the application development environment;

determining without user involvement that an instrument driver associated with the selected instrument is missing from a memory location allocated to the application development environment; and retrieving the missing instrument driver to the application development environment from a remote location without user involvement.

2. The method of claim 1, further comprising:

installing the missing instrument driver in the application development environment following retrieval.

3. The method of claim 1, further comprising:

using the retrieved instrument driver to communicate with the selected instrument.

4. The method of claim 1 wherein the retrieved instrument driver includes metadata which is examined prior to any installation of the retrieved instrument driver.

5. The method of claim 3, wherein the instrument driver retrieved to the application development environment is a newer version of an older instrument driver present in a user application, the retrieved newer version replacing the older instrument driver without user involvement.

6. The method of claim 4 wherein the examination of the metadata is a programmatic examination occurring without user involvement.

7. The method of claim 4 wherein the retrieved instrument driver is not installed following the examination of the metadata.

8. The method of claim 5 wherein the user is notified about the replacement of the instrument driver.

9. The method of claim 5 wherein the user is not notified about the replacement of the instrument driver.

10. A computer-implemented method of selecting instrument drivers for an application development environment, the method comprising:

providing an application development environment in a computing device, the computing device interfaced with at least one instrument that acquires data from a real world system under test, the application development environment performing at least one of modeling, simulating or analyzing of the data;

providing a user interface within the application development environment that identifies at least one currently installed instrument driver and enables the selection of an instrument driver from a plurality of instrument drivers located remotely and locally;

receiving, via the user interface, a selection identifying an instrument driver for the at least one instrument from the plurality of instrument drivers; and examining a collection of metadata associated with the selected instrument driver prior to installing the selected instrument driver in the application development environment.

11. The method of claim 10 wherein the selected instrument driver is retrieved from a remote location to the application development environment.

12. The method of claim 10 wherein the user interface is a command line interface.

13. The method of claim 10 wherein the user interface is a graphical interface.

14. The method of claim 10 wherein the instrument drivers are stored at a plurality of remote locations.

15. A computer-implemented method of selecting instrument drivers for a block diagram environment, the method comprising:

providing a block diagram environment in a computing device, the computing device interfaced with at least one instrument that acquires data from a real-world system under test, the block diagram environment executing a model of the real-world system under test using the data;

receiving a selection of the at least one instrument through the block diagram environment;

querying programmatically without user involvement the at least one instrument to obtain information about an instrument driver needed to communicate with the at least one instrument;

determining without user involvement that an instrument driver associated with the at least one instrument is missing from a memory location allocated to the block diagram environment; and retrieving the missing instrument driver to the block diagram environment from a remote location without involvement of a user.

16. The method of claim 15, further comprising:
installing the missing instrument driver in the block diagram environment following retrieval.

17. The method of claim 15, further comprising:
using the retrieved instrument driver to communicate with the at least one instrument.

18. The method of claim 15 wherein the retrieved instrument driver includes metadata which is examined prior to any installation of the retrieved instrument driver.

19. The method of claim 17, wherein the instrument driver retrieved to the block diagram environment is a newer version of an older instrument driver present in the block diagram environment, the retrieved newer version replacing the older instrument driver without user involvement.

20. The method of claim 18 wherein the examination of the metadata is a programmatic examination occurring without user involvement.

21. The method of claim 18 wherein the retrieved instrument driver is not installed following the examination of the metadata.

22. A system for selecting instrument drivers for an application development environment, the system comprising:

a memory holding an application development environment in a computing device, the computing device interfaced with at least one instrument that acquires data from a real world system under test, the application development environment performing at least one of moldeling, simulating or analyzing of the data;

a user interface within the application development environment that enables the selection of the at least one instrument, the user interface also enabling access to at least one remote storage location holding an instrument driver associated with the at least one instrument; and programmatically determining without user involvement that an instrument driver associated with the at least one instrument is missing from the application development environment; and retrieving the missing instrument driver to the application development environment from the at least one remote storage location without involvement of a user.

23. The system of claim 22 wherein the retrieved instrument driver includes metadata which is examined prior to any installation of the retrieved instrument driver.

24. The system of claim 22 wherein the retrieved instrument driver is used to communicate with the selected instrument.

25. The system of claim 23 wherein the examination of the metadata is a programmatic examination occurring without user involvement.

26. The system of claim 24, wherein the instrument driver retrieved to the application development environment is a newer version of an older instrument driver present in a user application, the retrieved newer version replacing the older instrument driver without user involvement.

27. The system of claim 25 wherein the retrieved instrument driver is not installed following the examination of the metadata.

28. The system of claim 26 wherein the user interface enables access to a plurality of remote storage locations holding instrument drivers.

29. A physical medium for use with a computing device, the medium holding computer-executable instructions for selecting instrument drivers, the instructions comprising:

instructions for providing an application development environment in a computing device, the computing device interfaced with at least one instrument that acquires data from a real world system under test, the application development environment performing at least one of moldeling, simulating or analyzing of the data;

instructions for receiving a selection of the at least one instrument through a user interface operating in the application development environment;

instructions for determining without user involvement that an instrument driver associated with the selected instrument is missing from a memory location allocated to the application development environment; and instructions for retrieving the missing instrument driver to the application development environment from a remote location without involvement of a user.

30. The medium of claim 29, wherein the instructions further comprise:
instructions for installing the missing instrument driver in the application development environment following retrieval.

31. The medium of claim 29, the instructions further comprise:
instructions for using the retrieved instrument driver to communicate with the selected instrument.

32. The medium of claim 29 wherein the retrieved instrument driver includes metadata which is examined prior to any installation of the retrieved instrument driver.

33. The medium of claim 31 wherein the instrument driver retrieved to the application development environment is a newer version of an older instrument driver present in a user application, the retrieved newer version replacing the older instrument driver without user involvement.

34. The medium of claim 32 wherein the examination of the metadata is a programmatic examination occurring without user involvement.

35. The medium of claim 32 wherein the retrieved instrument driver is not installed following the examination of the metadata.

36. The medium of claim 33 wherein the user is notified about the replacement of the instrument driver.

37. The medium of claim 33 wherein the user is not notified about the replacement of the instrument driver.

38. A physical medium for use with a computing device, the medium holding computer-executable instructions for selecting instrument drivers, the instructions comprising:

instructions for providing an application development environment in a computing device, the computing device interfaced with at least one instrument that acquires data from a real world system under test, the application development environment performing at least one of modeling, simulating or analyzing of the data;

instructions for providing a user interface within the application development environment that identifies at least one currently installed instrument driver and enables the selection of an instrument driver from a plurality of instrument drivers located remotely and locally;

instructions for receiving, via the user interface, a selection identifying an instrument driver for the at least one instrument from the plurality of instrument drivers; and instructions for examining a collection of metadata associated with the selected instrument driver prior to installing the selected instrument driver in the application development environment.

39. The medium of claim 38 wherein the selected instrument driver is retrieved from a remote location to the application development environment.

40. A method of uploading instrument drivers from an application development environment, the method comprising:

providing an application development environment in a computing device, the computing device interface with at least one instrument that acquires data from a real world system under test, the application development environment performing at least one of moldeling, simulating or analyzing of the data;

receiving a selection of an instrument through a user interface in the application development environment;

querying programmatically without user involvement the selected instrument to obtain instrument driver information for the selected instrument;

determining without user involvement that an instrument driver associated with the selected instrument is missing from a repository of instrument drivers; and uploading the instrument driver for the selected instrument to the repository of instrument drivers from the application development environment.

41. The method of claim 40 wherein a user selects the repository of instrument drivers.

42. The method of claim 40 wherein a user selects an upload option via a user interface contained in the application development environment prior to determining whether the instrument driver is missing from the repository of instrument drivers.

* * * * *

UNITED STATES PATENT AND TRADEMARK OFFICE
CERTIFICATE OF CORRECTION

| | |
|---|---|
| PATENT NO. | : 7,400,997 B2 |
| APPLICATION NO. | : 11/140137 |
| DATED | : July 15, 2008 |
| INVENTOR(S) | : Patrick L. Edson |

It is certified that error appears in the above-identified patent and that said Letters Patent is hereby corrected as shown below:

On the title page, in the Abstract section (57), in the printed patent, at line 3, please change "tat" to --that--.

Column 4, line 42, change "diagrams" to --diagram--.

In the claims, column 10, line 2, please change "moldeling" to --modeling--.

In the claims, column 10, line 44, please change "moldeling" to --modeling--.

In the claims, column 11, line 24, please change "test,the" to --test, the--.

In the claims, column 12, line 12, please change "interface" to --interfaced--.

In the claims, column 12, line 15, please change "moldeling" to --modeling--.

Signed and Sealed this

Thirtieth Day of September, 2008

JON W. DUDAS
*Director of the United States Patent and Trademark Office*